(12) United States Patent
Aakre et al.

(10) Patent No.: US 8,875,797 B2
(45) Date of Patent: Nov. 4, 2014

(54) METHOD FOR FLOW CONTROL AND AUTONOMOUS VALVE OR FLOW CONTROL DEVICE

(75) Inventors: Haavard Aakre, Skien (NO); Vidar Mathiesen, Porsgrunn (NO)

(73) Assignee: Statoil Petroleum AS, Stavanger (NO)

( * ) Notice: Subject to any disclaimer, the term of this patent is extended or adjusted under 35 U.S.C. 154(b) by 505 days.

(21) Appl. No.: 12/084,479

(22) PCT Filed: Jun. 13, 2007

(86) PCT No.: PCT/NO2007/000204
§ 371 (c)(1),
(2), (4) Date: Jan. 28, 2009

(87) PCT Pub. No.: WO2008/004875
PCT Pub. Date: Jan. 10, 2008

(65) Prior Publication Data
US 2009/0218103 A1 Sep. 3, 2009

(30) Foreign Application Priority Data
Jul. 7, 2006 (NO) ................................... 20063181

(51) Int. Cl.
*E21B 34/08* (2006.01)
*F16K 15/02* (2006.01)
*E21B 43/12* (2006.01)
*E21B 43/32* (2006.01)
*G05D 7/01* (2006.01)

(52) U.S. Cl.
CPC ................. *E21B 34/08* (2013.01); *F16K 15/02* (2013.01); *E21B 43/12* (2013.01); *E21B 43/32* (2013.01); *G05D 7/0146* (2013.01)
USPC .......................... 166/386; 166/319; 166/373

(58) Field of Classification Search
CPC ........ E21B 34/08; E21B 34/10; E21B 34/085
USPC ............... 166/386, 373, 370, 50; 137/533.19, 137/533.17, 533
See application file for complete search history.

(56) References Cited

U.S. PATENT DOCUMENTS 3,536,090 A    10/1970   Scott, Jr.
3,550,616 A *  12/1970   Graham et al. ............ 137/513.7

(Continued)

FOREIGN PATENT DOCUMENTS

GB    2 169 018 A    7/1986
GB    2376488        12/2002

(Continued)

OTHER PUBLICATIONS

International Search Report issued Oct. 5, 2007 in the International (PCT) Application of which the present application is the U.S. National Stage.

(Continued)

*Primary Examiner* — Jennifer H Gay
*Assistant Examiner* — Elizabeth Gitlin
(74) *Attorney, Agent, or Firm* — Birch, Stewart, Kolasch & Birch, LLP (57) ABSTRACT

A method for flow control and a self-adjusting valve or flow control device, in particular useful in a production pipe for producing oil and/or gas from a well in an oil and/or gas reservoir, which production pipe includes a lower drainage pipe preferably being divided into at least two sections each including one or more inflow control devices which communicates the geological production formation with the flow space of the drainage pipe. The fluid flows through an inlet and further through a flow path of the control device passing by a movable disc or movable device which is designed to move relative to the opening of the inlet and thereby reduce or increase the flow-through area by exploiting the Bernoulli effect and stagnation pressure created over the disc, whereby the control device, depending on the composition of the fluid and its properties, automatically adjusts the flow of the fluid based on a pre-estimated flow design.

35 Claims, 5 Drawing Sheets

(56) References Cited

U.S. PATENT DOCUMENTS

| | | | |
|---|---|---|---|
| 3,807,429 A | 4/1974 | Breton | |
| 4,387,732 A | 6/1983 | Hetz | |
| 4,577,691 A | 3/1986 | Huang et al. | |
| 4,660,760 A | 4/1987 | Bennett et al. | |
| 4,821,801 A | 4/1989 | Van Laar | |
| 4,858,691 A | 8/1989 | Ilfrey et al. | |
| 5,435,393 A * | 7/1995 | Brekke et al. | 166/370 |
| 5,551,466 A | 9/1996 | De Pieri | |
| 5,803,179 A | 9/1998 | Echols et al. | |
| 5,896,928 A | 4/1999 | Coon | |
| 6,112,817 A | 9/2000 | Voll et al. | |
| 6,279,660 B1 | 8/2001 | Hay | |
| 6,354,378 B1 | 3/2002 | Patel | |
| 6,371,210 B1 | 4/2002 | Bode et al. | |
| 6,786,285 B2 * | 9/2004 | Johnson et al. | 166/370 |
| 6,951,252 B2 * | 10/2005 | Restarick et al. | 166/313 |
| 7,185,706 B2 | 3/2007 | Freyer | |
| 7,290,606 B2 | 11/2007 | Coronado et al. | |
| 7,419,002 B2 | 9/2008 | Dybevik et al. | |
| 7,819,196 B2 * | 10/2010 | Aakre | 166/369 |
| 7,918,275 B2 * | 4/2011 | Clem | 166/250.15 |
| 2005/0072578 A1 | 4/2005 | Steele et al. | |
| 2006/0027377 A1 | 2/2006 | Schoonderbeek et al. | |
| 2008/0035875 A1 * | 2/2008 | Tai et al. | 251/318 |

FOREIGN PATENT DOCUMENTS

| | | |
|---|---|---|
| GB | 2 405 655 A | 3/2005 |
| GB | 2 421 746 A | 7/2006 |
| NO | 305376 B1 | 5/1999 |
| NO | 306127 B1 | 9/1999 |
| WO | WO 91/03781 A1 | 3/1991 |
| WO | WO 92/08875 | 5/1992 |
| WO | WO 97/38248 | 10/1997 |
| WO | WO 00/63530 | 10/2000 |
| WO | 02/46576 | 6/2002 |
| WO | 02066787 | 8/2002 |
| WO | WO 2005/080750 A1 | 9/2005 |
| WO | WO 2006/015277 A1 | 2/2006 |
| WO | WO 2007/027617 A2 | 3/2007 |

OTHER PUBLICATIONS

Norwegian Search Report (in English language) issued Feb. 6, 2007 in International Application No. PCT/NO2007/000204.

White et al., "Controlling flow in horizontal wells," World Oil, Nov. 1991, pp. 73-80.

\* cited by examiner

METHOD FOR FLOW CONTROL AND AUTONOMOUS VALVE OR FLOW CONTROL DEVICE

BACKGROUND OF THE INVENTION

1. Field of the Invention

The present invention relates to a method for self-adjusting (autonomously adjusting) the flow of a fluid through a valve or flow control device, and a self adjusting valve or flow control device. This is in particular useful in a production pipe for producing oil and/or gas from a well in an oil and/or gas reservoir, which production pipe includes a lower drainage pipe preferably being divided into at least two sections each including one or more inflow control devices which communicates the geological production formation with the flow space of the drainage pipe.

2. Description of the Background Art

Devices for recovering of oil and gas from long, horizontal and vertical wells are known from US patent publications Nos. 4,821,801, 4,858,691, 4,577,691 and GB patent publication No. 2169018.

These known devices comprise a perforated drainage pipe with, for example, a filter for control of sand around the pipe. A considerable disadvantage with the known devices for oil/ and or gas production in highly permeable geological formations is that the pressure in the drainage pipe increases exponentially in the upstream direction as a result of the flow friction in the pipe. Because the differential pressure between the reservoir and the drainage pipe will decrease upstream as a result, the quantity of oil and/or gas flowing from the reservoir into the drainage pipe will decrease correspondingly. The total oil and/or gas produced by this means will therefore be low. With thin oil zones and highly permeable geological formations, there is further a high risk that of coning, i.e. flow of unwanted water or gas into the drainage pipe downstream, where the velocity of the oil flow from the reservoir to the pipe is the greatest.

From World Oil, vol. 212, N. 11 (11/91), pages 73-80, is previously known to divide a drainage pipe into sections with one or more inflow restriction devices such as sliding sleeves or throttling devices. However, this reference is mainly dealing with the use of inflow control to limit the inflow rate for up hole zones and thereby avoid or reduce coning of water and or gas.

WO-A-9208875 describes a horizontal production pipe comprising a plurality of production sections connected by mixing chambers having a larger internal diameter than the production sections. The production sections comprise an external slotted liner which can be considered as performing a filtering action. However, the sequence of sections of different diameter creates flow turbulence and prevents the running of work-over tools.

US 2006/0027377 describes a well conduit that has an aperture for communicating with a target reservoir and a one-way valve in the aperture may be used in injection and production wells. One-way valves are described which use a spring or a ball to control fluid flow in one direction from the interior to the exterior of a pipe.

When extracting oil and/or gas from geological production formations, fluids of different qualities, i.e. oil, gas, water (and sand) is produced in different amounts and mixtures depending on the property or quality of the formation. None of the above-mentioned, known devices are able to distinguish between and control the inflow of oil, gas or water on the basis of their relative composition and/or quality.

SUMMARY OF THE INVENTION

There is described herein an inflow control device which is self adjusting or autonomous and can easily be fitted in the wall of a production pipe and which therefore provide for the use of work-over tools. The device is designed to "distinguish" between the oil and/or gas and/or water and is able to control the flow or inflow of oil or gas, depending on which of these fluids such flow control is required.

The device is robust, can withstand large forces and high temperatures, prevents draw dawns (differential pressure) needs no energy supply, can withstand sand production, is reliable, but is still simple and very cheap.

The invention provides a method and valve or flow control device as set out in the accompanying claims.

BRIEF DESCRIPTION OF THE DRAWINGS

Embodiments of the present invention will be further described in the following by means of examples and with reference to the drawings, where.

DETAILED DESCRIPTION OF THE PREFERRED EMBODIMENTS

Figure 1:
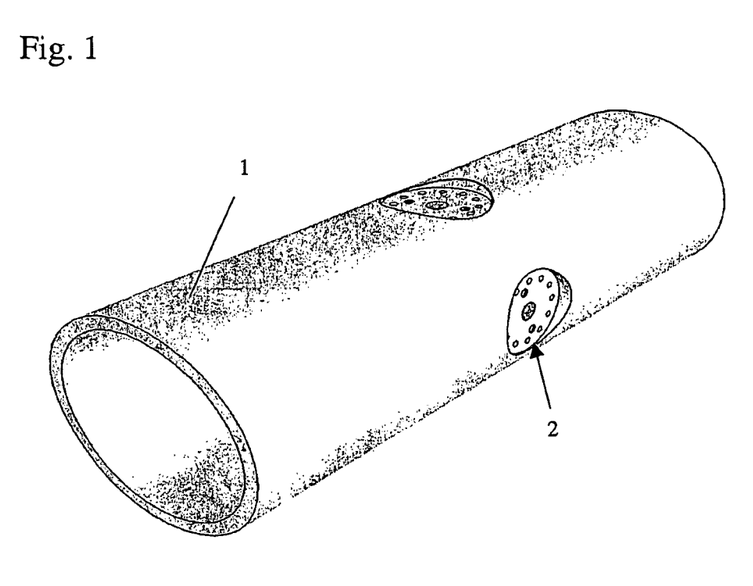
FIG. 1 shows a schematic view of a production pipe with a control device according to the present invention, FIG. 2 a) shows, in larger scale, a cross section of the control device according to the invention, b) shows the same device in a top view.

FIG. 1 shows, as stated above, a section of a production pipe 1 in which a prototype of a control device 2 according to the invention is provided. The control device 2 is preferably of circular, relatively flat shape and may be provided with external threads 3 (see FIG. 2) to be screwed into a circular hole with corresponding internal threads in the pipe. By controlling the thickness, the device 2 may be adapted to the thickness of the pipe and fit within its outer and inner periphery.

Figure 2:
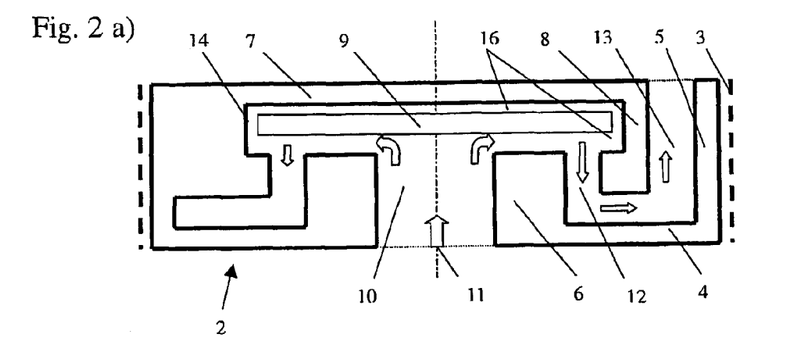

FIGS. 2 a) and b) show the control device 2 in larger scale. The device consists of a first disc-shaped housing body 4 with an outer cylindrical segment 5 and inner cylindrical segment 6 and with a central hole or aperture 10, and a second disc-shaped holder body 7 with an outer cylindrical segment 8, as well as a preferably flat disc or freely movable body 9 provided in an open space 14 formed between the first 4 and second 7 disc-shaped housing and holder bodies. The body 9 may for particular applications and adjustments depart from the flat shape and have a partly conical or semicircular shape (for instance towards the aperture 10.) As can be seen from the figure, the cylindrical segment 8 of the second disc-shaped holder body 7 fits within and protrudes in the opposite direction of the outer cylindrical segment 5 of the first disc-shaped housing body 4 thereby forming a flow path as shown by the arrows 11, where the fluid enters the control device through the central hole or aperture (inlet) 10 and flows towards and radially along the disc 9 before flowing through the annular opening 12 formed between the cylindrical segments 8 and 6 and further out through the annular opening 13 formed between the cylindrical segments 8 and 5. The two disc-shaped housing and holder bodies 4, 7 are attached to one another by a screw connection, welding or other means (not further shown in the figures) at a connection area 15 as shown in FIG. 2b).

The present invention exploits the effect of the Bernoulli teaching that the sum of static pressure, dynamic pressure and friction is constant along a flow line:

$$p_{static} + \frac{1}{2}\rho v^2 + \Delta p_{friction}$$

When subjecting the disc 9 to a fluid flow, which is the case with the present invention, the pressure difference over the disc 9 can be expressed as follows:

$$\Delta p_{over} = [p_{over(p_4)} - p_{under(f(p_1, p_2, p_3))}] = \frac{1}{2}\rho v^2$$

Due to lower viscosity, a fluid such as gas will "make the turn later" and follow further along the disc towards its outer end (indicated by reference number 14). This makes a higher stagnation pressure in the area 16 at the end of the disc 9, which in turn makes a higher pressure over the disc. And the disc 9, which is freely movable within the space between the disc-shaped bodies 4, 7, will move downwards and thereby narrow the flow path between the disc 9 and inner cylindrical segment 6. Thus, the disc 9 moves downwards or upwards depending on the viscosity of the fluid flowing through, whereby this principle can be used to control (close/open) the flow of fluid through the device.

Figure 3:
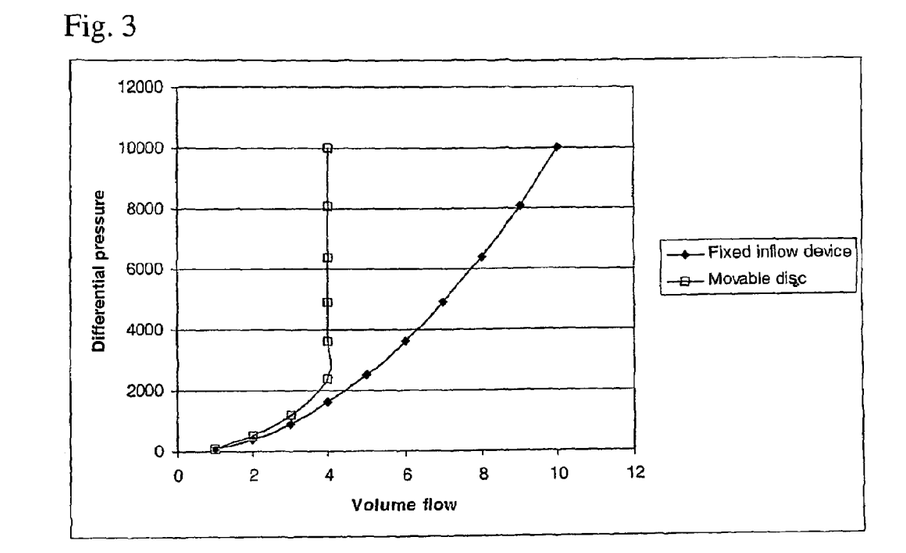
FIG. 3 is a diagram showing the flow volume through a control device according to the invention vs. the differential pressure in comparison with a fixed inflow device.

Further, the pressure drop through a traditional inflow control device (ICD) with fixed geometry will be proportional to the dynamic pressure:

$$\Delta p = K \cdot \frac{1}{2}\rho v^2$$

where the constant, K is mainly a function of the geometry and less dependent on the Reynolds number. In the control device according to the present invention, the flow area will decrease when the differential pressure increases, such that the volume flow through the control device will not, or nearly not, increase when the pressure drop increases. A comparison between a control device according to the present invention with a movable disc and a control device with a fixed flow-through opening is shown in FIG. 3, and as can be seen from the figure, the flow-through volume for the present invention is constant above a given differential pressure.

This represents a major advantage with the present invention as it can be used to ensure the same volume flowing through each section for the entire horizontal well, which is not possible with fixed inflow control devices.

Figure 4:
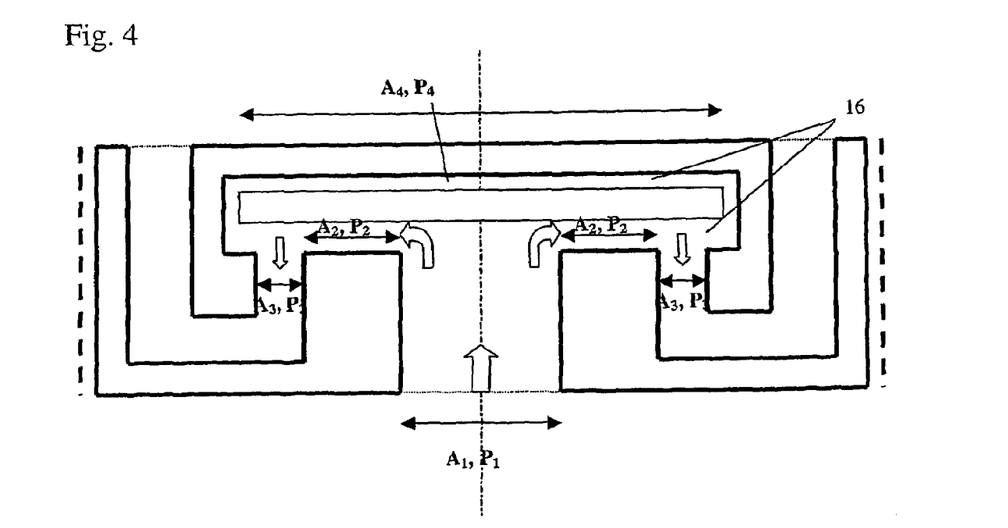
FIG. 4 shows the device shown in FIG. 2, but with the indication of different pressure zones influencing the design of the device for different applications.

When producing oil and gas, the control device according to the invention may have two different applications: Using it as an inflow control device to reduce inflow of water, or using it to reduce inflow of gas at gas break through situations. When designing the control device according to the invention for the different applications such as water or gas, as mentioned above, the different areas and pressure zones, as shown in FIG. 4, will have an impact on the efficiency and flow through properties of the device. Referring to FIG. 4, the different area/pressure zones may be divided into:

$A_1$, $P_1$ is the inflow area and pressure respectively. The force ($P_1 \cdot A_1$) generated by this pressure will strive to open the control device (move the disc 9 upwards).

$A_2$, $P_2$ is the area and pressure in the zone where the velocity will be largest and hence represents a dynamic pressure source. The resulting force of the dynamic pressure will strive to close the control device (move the disc downwards as the flow velocity increases).

$A_3$, $P_3$ is the area and pressure at the outlet. This should be the same as the well pressure (inlet pressure).

$A_4$, $P_4$ is the area and pressure (stagnation pressure) behind the disc. The stagnation pressure, at position 16 (FIG. 2), creates the pressure and the force behind the disc. This will strive to close the control device (move the disc downwards).

Fluids with different viscosities will provide different forces in each zone depending on the design of these zones. In order to optimize the efficiency and flow through properties of the control device, the design of the areas will be different for different applications, e.g. gas/oil or oil/water flow. Hence, for each application the areas need to be carefully balanced and optimally designed taking into account the properties and physical conditions (viscosity, temperature, pressure etc.) for each design situation.

Figure 5:
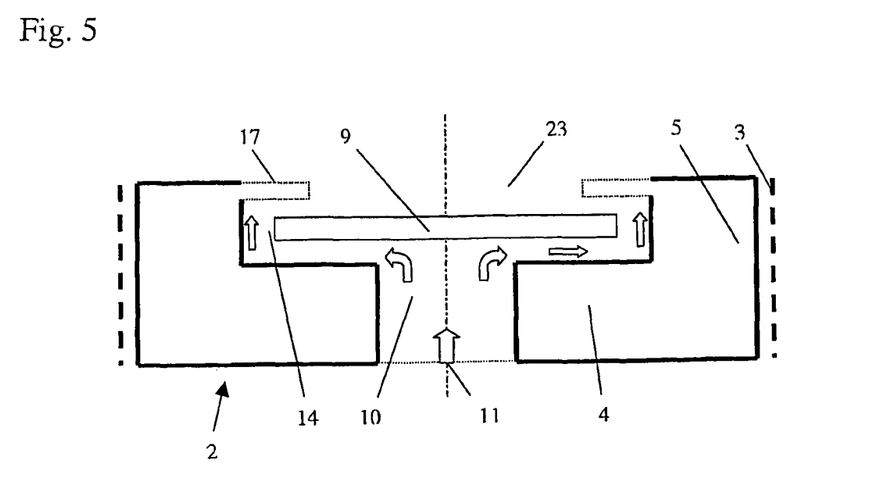
FIG. 5 shows a principle sketch of another (second) embodiment of the control device according to the invention.

FIG. 5 shows a principle sketch of another embodiment of the control device according to the invention, which is of a more simple design than the version shown in FIG. 2. The control device 2 consists, as with the version shown in FIG. 2, of a first disc-shaped housing body 4 with an outer cylindrical segment 5 and with a central hole or aperture 10, and a second disc-shaped holder body 17 attached to the segment 5 of the housing body 4, as well as a preferably flat disc 9 provided in an open space 14 formed between the first and second disc-shaped housing and holder bodies 4, 17. However, since the second disc-shaped holder body 17 is inwardly open (through a hole or holes 23 etc.) and is now only holding the disc in place, and since the cylindrical segment 5 is shorter with a different flow path than what is shown in FIG. 2, there is no build up of stagnation pressure ($P_4$) on the back side of the disc 9 as explained above in conjunction with FIG. 4. With this solution without stagnation pressure, the building thickness for the device is lower and may withstand a larger amount of particles contained in the fluid.

Figure 6:
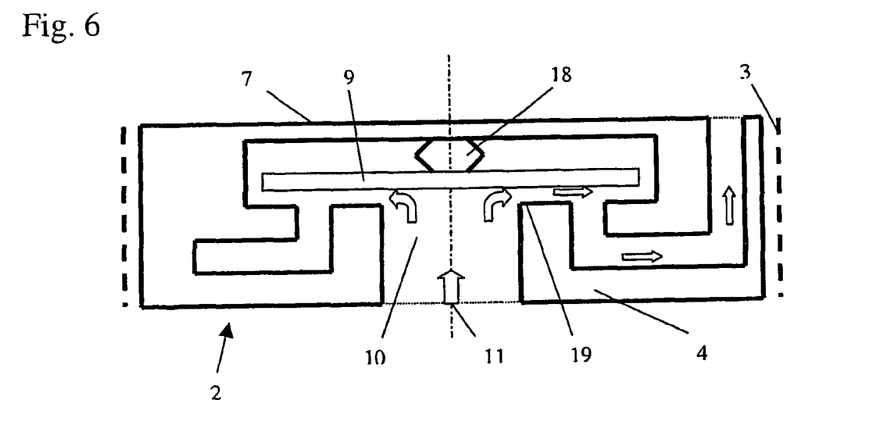
FIG. 6 shows a principle sketch of a third embodiment of the control device according to the invention.

FIG. 6 shows a third embodiment according to the invention where the design is the same as with the example shown in FIG. 2, but where a spring element 18, in the form of a spiral or other suitable spring device, is provided on either side of the disc and connects the disc with the holder (7, 22), recess (21) or housing (4).

The spring element 18 is used to balance and control the inflow area between the disc 9 and the inlet 10, or rather the surrounding edge or seat 19 of the inlet 10. Thus, depending on the spring constant and thereby the spring force, the opening between the disc 9 and edge 19 will be larger or smaller, and with a suitable selected spring constant, depending on the inflow and pressure conditions at the selected place where the control device is provided, constant mass flow through the device may be obtained.

Figure 7:
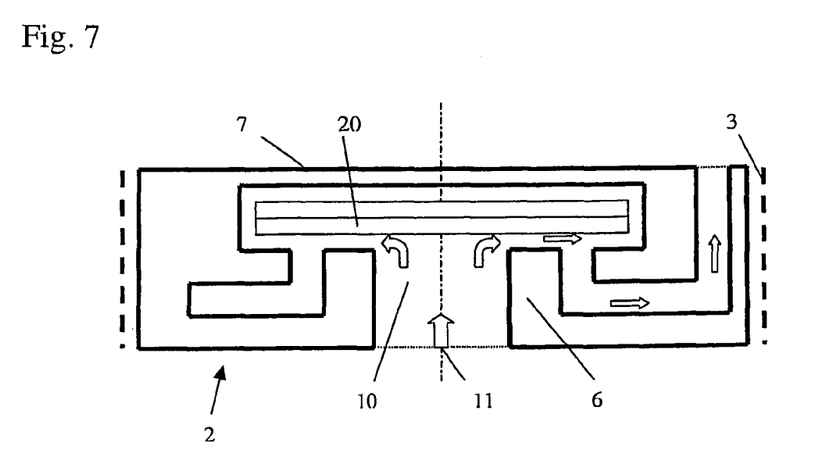
FIG. 7 shows a principle sketch of a fourth embodiment of the control device according to the invention.

FIG. 7 shows a fourth embodiment of the invention, where the design is the same as with the example in FIG. 6 above, but where the disc 9 is, on the side facing the inlet opening 10, provided with a thermally responsive device such as bi-metallic element 20. When producing oil and/or gas the conditions may rapidly change from a situation where only or mostly oil is produced to a situation where only or mostly gas is produced (gas break-through or gas coning). With for instance a pressure drop of 16 bar from 100 bar the temperature drop would correspond to approximately 20° C. By providing the disc 9 with a thermally responsive element such as a bi-metallic element as shown in FIG. 7, the disc 9 will bend upwards or be moved upwards by the element 20 abutting the holder shaped body 7 and thereby narrowing the opening between the disc and the inlet 10 or fully closing said inlet.

Figure 8:
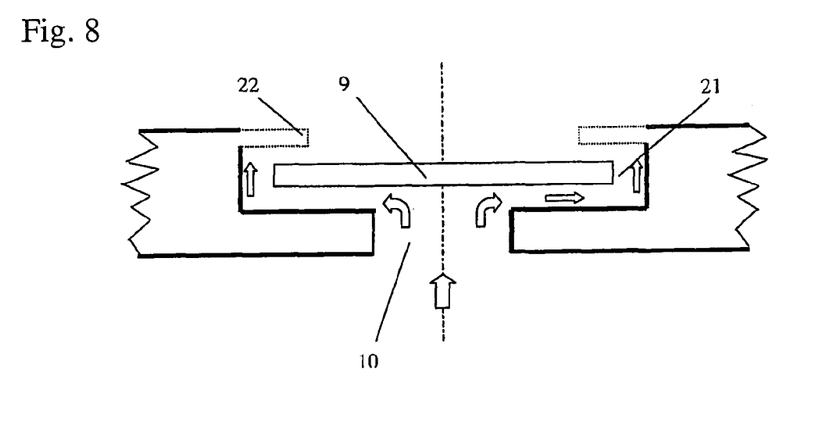
FIG. 8 shows a principle sketch of a fifth embodiment of the invention where the control device is an integral part of a flow arrangement.

The above examples of a control device according to the invention as shown in FIGS. 1 and 2 and 4-7 are all related to solutions where the control device as such is a separate unit or device to be provided in conjunction with a fluid flow situation or arrangement such as the wall of a production pipe in connection with the production of oil and gas. However, the control device may, as shown in FIG. 8, be an integral part of the fluid flow arrangement, whereby the disc 9 may be provided in a recess 21 facing the outlet of an aperture or hole 10 of for instance a wall of a pipe 1 as shown in FIG. 1 instead of being provided in a separate housing body 4. Further, the disc may be held in place in the recess by means of a holder device such as inwardly protruding spikes, a circular ring 22 or the like being connected to the outer opening of the recess by means of screwing, welding or the like.

The present invention as defined in the claims is not restricted to the application related to inflow of oil and/or gas from a well as described above or when injecting gas (natural gas, air or $CO_2$), steam or water into an oil and/or gas producing well. Thus, the invention may be used in any processes or process related application where the flow of fluids with different gas and/or liquid compositions needs to be controlled.

The invention claimed is:

1. A method for autonomously adjusting the flow of a fluid through a valve or flow control device into a production pipe of a well in a reservoir containing at least one of oil and gas, said method comprising the steps of:
    allowing said fluid to flow through an inlet thereby forming a flow path through the valve or flow control device passing by a movable disc or body which is designed to move relative to the opening of the inlet and thereby reduces or increases the flow-through area of the valve or flow control device;
    creating, depending on at least the flow-through area and the viscosity of the fluid flowing through the inlet, a fluid pressure difference between opposite sides of the moveable disc or body; and
    moving the disc or body with a force due to the created fluid pressure difference, such that the viscosity of the fluid is used to control the flow of fluid through said valve or flow control device.

2. The method as claimed in claim 1,
    wherein the Bernoulli effect that is created when the disc or body is exposed to a flow of fluid and any stagnation pressure created over the disc or body are exploited to move said disc or body, and
    wherein the valve or flow control device, depending on the composition of the fluid and the properties of the fluid, autonomously adjusts the flow of the fluid based on a pre-determined flow design.

3. The method as claimed in claim 1, wherein the fluid is composed of at least one of one or more gases and one or more liquids, which may be at least one of the following: water, oil, natural or produced gas, and $CO_2$.

4. The method as claimed in claim 1, wherein the Bernoulli effect that is created when the disc or body is exposed to a flow of fluid is exploited to move said disc or body.

5. A self-adjustable (autonomous) valve or flow control device for controlling the flow of a fluid into a production pipe of a well in a reservoir containing at least one of oil and gas, comprising:
    a movable disc or controlling body provided in a recess of a wall of the pipe or in a separate housing body in the wall, said movable disc or controlling body being arranged to form a flow path where the fluid enters the valve or control device through an inlet flowing towards and along the disc or body and out of the recess or housing body,
    wherein the movement of the disc or body is arranged to reduce or increase the flow-through area of the valve or flow control device, and
    wherein the disc or body is accommodated in the valve or control device such that it is moved with a force due to a fluid pressure difference between opposite sides of the disc or body, the fluid pressure difference being created depending on at least the flow-through area and the viscosity of the fluid flowing through the inlet, such that the viscosity of the fluid is used to control the flow of fluid through said valve or flow control device.

6. The valve or flow control device as claimed in claim 5, wherein movement of said disc or body is arranged to reduce or increase the flow-through area by exploiting the Bernoulli effect that is created when the disc or body is exposed to a flow of fluid and any stagnation pressure created over the disc or body.

7. The valve or flow control device as claimed in claim 5, wherein movement of said disc or body is arranged to autonomously adjust the flow of said fluid based on a pre-determined flow design, and in dependence on the composition of the fluid and the properties of the fluid.

8. The valve or flow control device as claimed in claim 5, further comprising:
    a first disc-shaped body including an outer cylindrical segment, an inner cylindrical segment and the inlet, the inlet being a central aperture; and
    a second disc-shaped body including an outer cylindrical segment,
    wherein the movable disc or controlling body is a flat disc provided between the first and second disc-shaped bodies, and
    wherein the cylindrical segment of the second disc-shaped body fits within and protrudes in the opposite direction from the outer cylindrical segment of the first disc-shaped body, thereby forming the flow path where the fluid enters the valve or flow control device through the inlet, flowing towards and along the disc before flowing through an annular opening formed between the cylindrical segments of the first and second disc-shaped bodies and further out through an annular opening formed between the cylindrical segments of the first and second disc-shaped bodies.

9. The valve or flow control device as claimed in claim 5, wherein a spring is provided on one side of said disc or body and connects said disc or body with the first or second disc-shaped body.

10. The valve or flow control device as claimed in claim 5, wherein said disc or body is freely movable.

11. The valve or flow control device as claimed in claim 5, wherein said disc or body on the side facing the inlet is provided with a thermally responsive device.

12. The valve or flow control device as claimed in claim 11, wherein the thermally responsive device is a bi-metallic element.

13. The valve or flow control device as claimed in claim 5, wherein, in the event of a gas or water breakthrough, in which there is a sudden increase of gas flow into said inlet, movement of said disc or body is arranged to narrow the opening between the disc or body and the inlet, or to fully close said inlet.

14. The valve or flow control device as claimed in claim 5, wherein, as a result of the lower viscosity of the fluid, and a resulting higher stagnation pressure on the opposite side of said disc or body to said inlet, said disc or body is arranged to narrow the flow path through said valve or control device through said valve or flow control device.

15. The valve or flow control device as claimed in claim 5, wherein at least of one of said disc and said body, said inlet, said first or second disc-shaped body are dimensioned and arranged so that the flow-through volume of the valve or flow control device is substantially constant above a given differential pressure.

16. The valve or flow control device as claimed in claim 5, wherein movement of said disc or body is arranged to reduce or increase the flow-through area by exploiting the Bernoulli effect that is created when the disc or body is exposed to a flow of fluid.

17. A self-adjustable flow control device for controlling the flow of a fluid into a production pipe of a well in a reservoir containing at least one of oil and gas, comprising:
a movable body provided in a recess of a wall of the production pipe or in a separate housing body in the wall;
an inlet formed in the wall of the production pipe or in the separate housing body in the wall;
an outlet formed in the wall of the production pipe or in the separate housing body in the wall, and
wherein said movable body is arranged between the inlet and the outlet, and the movable body is moved with a force due to a fluid pressure difference between opposite sides of the disc or body, the fluid pressure difference being created depending on at least the flow-through area and the viscosity of the fluid flowing through the inlet, such that the viscosity of the fluid is used to control the flow of fluid through the flow control device.

18. The flow control device as claimed in claim 17, wherein an axis of the inlet is spaced from an axis of the outlet.

19. The flow control device as claimed in claim 17, wherein movement of said movable body is arranged to reduce or increase the flow-through area by exploiting the Bernoulli effect that is created when the disc or body is exposed to a flow of fluid and any stagnation pressure created over the disc or body.

20. The flow control device as claimed in claim 17, wherein movement of said movable body is arranged to autonomously adjust the flow of said fluid based on a pre-determined flow design, and in dependence on the composition of the fluid and the properties of the fluid.

21. The flow control device as claimed in claim 17, wherein a flow path between said inlet and said outlet includes a first portion in a direction toward the movable body, a second portion perpendicular to said first portion and in a radial direction of the movable body, a third portion in a direction opposite to the first portion, and a fourth portion in the same direction as said first portion, but radially spaced therefrom.

22. The flow control device as claimed in claim 17, wherein movement of said movable body is arranged to reduce or increase the flow-through area by exploiting the Bernoulli effect that is created when the disc or body is exposed to a flow of fluid.

23. A method for autonomously adjusting the flow of a fluid through a valve or flow control device into a production pipe of a well in a reservoir containing at least one of oil and gas, said method comprising the steps of:
allowing said fluid to flow through an inlet thereby forming a flow path through the valve or flow control device passing by a movable disc or body, which is designed to move relative to the opening of the inlet and thereby reduce or increase the flow-through area of the valve or flow control device;
creating, according to the Bernoulli effect that is created when the disc or body is exposed to a flow of fluid, a pressure difference between opposite sides of the disc or body, and
moving the disc or body with a force due to the created pressure difference,
wherein the valve or flow control device, depending on the composition of the fluid and the properties of the fluid, autonomously adjusts the flow of the fluid based on a pre-determined flow design.

24. The method as claimed in claim 23, wherein said step of creating a pressure difference between opposite sides of the disc or body is according to the Bernoulli effect that is created when the disc or body is exposed to a flow of fluid and any stagnation pressure created over the disc.

25. A self-adjustable (autonomous) valve or flow control device for controlling the flow of a fluid into a production pipe of a well in a reservoir containing at least one of oil and gas, comprising:
a movable disc or controlling body provided in a recess of a wall of the pipe or in a separate housing body in the wall, said movable disc or controlling body being arranged to form a flow path where the fluid enters the valve or control device through an inlet flowing towards and along the disc or body and out of the recess or housing body,
wherein movement of said disc or body is arranged to reduce or increase the flow-through area of the valve or flow control device,
wherein the disc or body is accommodated in the valve or control device such that it is moved with a force due to a fluid pressure difference between opposite sides of the disc or body, the fluid pressure difference being created according to the Bernoulli effect that is created when the disc or body is exposed to a flow of fluid.

26. The self-adjustable valve or flow control device according to claim 25, wherein the fluid pressure difference is created according to the Bernoulli effect that is created when the disc or body is exposed to a flow of fluid and any stagnation pressure created over the disc or body.

27. A method for autonomously adjusting the flow of a fluid through a flow control device into a production pipe of a well in a reservoir containing at least one of gas and oil, the flow control device being provided with an inlet and one or more outlets, and forming a flow path between the inlet and the one or more outlets, said method comprising the steps of:
permitting the fluid to flow through the inlet and into the flow path through the flow control device, the fluid passing a movable disc or body arranged in a recess and being held by a holding device, the disc or body being moved relative to the inlet and thereby reducing or increasing the flow-through area of the flow control device; and moving the disc or body with a force created by exploiting the Bernoulli effect that is created when the disc or body is exposed to a flow of fluid, whereby the flow control device, depending on the composition and the properties of the fluid, autonomously adjusts the flow of fluid.

28. The method as claimed in claim 27, wherein the fluid is composed of at least one of one or more gases and one or more liquids.

29. The method as claimed in claim 28, wherein the fluid is one or more of the following: water, oil, natural or produced gas, and $CO_2$.

30. The method as claimed in claim 27, wherein the fluid is one or more of the following: water, oil, natural or produced gas, and $CO_2$.

31. The method as claimed in claim 27, wherein said step of moving the disc or body is with a force created by exploiting the Bernoulli effect that is created when the disc or body is exposed to a flow of fluid and the stagnation pressure created over the disc or body.

32. A self-adjustable flow control device for controlling the flow of fluid into a production pipe of a well in a reservoir containing at least one of oil and gas, the flow control device comprising an inlet and one or more outlets, and forming a flow path between the inlet and the one or more outlets, wherein the flow control device comprises a movable disc or body provided in a recess and held by a holding device configured to hold the disc or body, the fluid entering the flow control device through the inlet, flowing towards and along the disc or body and out through the one or more outlets, wherein the disc or body is arranged to move with a force created by exploiting the Bernoulli effect that is created when the disc or body is exposed to a flow of fluid, whereby the flow-through area of the flow control device is reduced or increased, respectively, depending on the composition and the properties of the fluid.

33. The self-adjustable flow control device according to claim 32, wherein the disc or body is arranged to move with a force created by exploiting the Bernoulli effect that is created when the disc or body is exposed to a flow of fluid, and the stagnation pressure created over the disc or body, whereby the flow-through area of the flow control device is reduced or increased, respectively, depending on the composition and the properties of the fluid.

34. A self-adjustable (autonomous) valve or flow control device for controlling the flow of a fluid into a production pipe of a well in a reservoir containing at least one of oil and gas, comprising:

a movable disc or controlling body provided in a recess of a wall of the pipe or in a separate housing body in the wall, said movable disc or controlling body being arranged to form a flow path where the fluid enters the valve or control device through an inlet flowing towards and along the disc or body and out of the recess or housing body, wherein the disc or body moves depending on the viscosity of the fluid flowing through said inlet, and wherein the viscosity of the fluid is used to control the flow of fluid through said valve or flow control device, the valve or flow control device further comprising:

a first disc-shaped body including an outer cylindrical segment, an inner cylindrical segment and the inlet, the inlet being a central aperture; and a second disc-shaped body including an outer cylindrical segment, wherein the movable disc or controlling body is a flat disc provided between the first and second disc-shaped bodies, and wherein the cylindrical segment of the second disc-shaped body fits within and protrudes in the opposite direction from the outer cylindrical segment of the first disc-shaped body, thereby forming the flow path where the fluid enters the valve or flow control device through the inlet, flowing towards and along the disc before flowing through an annular opening formed between the cylindrical segments of the first and second disc-shaped bodies and further out through an annular opening formed between the cylindrical segments of the first and second disc-shaped bodies.

35. A self-adjustable flow control device for controlling the flow of a fluid into a production pipe of a well in a reservoir containing at least one of oil and gas, comprising:

a movable body provided in a recess of a wall of the production pipe or in a separate housing body in the wall;

an inlet formed in the wall of the production pipe or in the separate housing body in the wall; and an outlet formed in the wall of the production pipe or in the separate housing body in the wall, wherein said movable body is arranged between the inlet and the outlet, and the movable body is movable depending on the viscosity of the fluid flowing through said inlet, so that the viscosity of the fluid is used to control the flow of fluid through the flow control device, and wherein a flow path between said inlet and said outlet includes a first portion in a direction toward the movable body, a second portion perpendicular to said first portion and in a radial direction of the movable body, a third portion in a direction opposite to the first portion, and a fourth portion in the same direction as said first portion, but radially spaced therefrom.

* * * * *